United States Patent
Pfaff et al.

(10) Patent No.: US 11,536,031 B2
(45) Date of Patent: Dec. 27, 2022

(54) REINFORCING MESH ELEMENT, STRUCTURE HAVING SUCH A REINFORCING MESH ELEMENT AND METHOD FOR PRODUCING A REINFORCING MESH ELEMENT

(71) Applicant: Solidian GmbH, Albstadt (DE)

(72) Inventors: Johann Pfaff, Winterlingen (DE); Frank Werz, Sonnenbühl-Undingen (DE)

(73) Assignee: SOLIDIAN GMBH, Albstadt (DE)

( * ) Notice: Subject to any disclaimer, the term of this patent is extended or adjusted under 35 U.S.C. 154(b) by 874 days.

(21) Appl. No.: 16/347,714

(22) PCT Filed: Nov. 6, 2017

(86) PCT No.: PCT/EP2017/078359
§ 371 (c)(1),
(2) Date: May 6, 2019

(87) PCT Pub. No.: WO2018/083307
PCT Pub. Date: May 11, 2018

(65) Prior Publication Data
US 2019/0257086 A1 Aug. 22, 2019

(30) Foreign Application Priority Data

Nov. 7, 2016 (EP) ..................................... 16197615

(51) Int. Cl.
| | |
|---|---|
| *E04C 5/07* | (2006.01) |
| *B29C 70/68* | (2006.01) |
| *B29C 70/88* | (2006.01) |
| *C08J 7/04* | (2020.01) |
| *E04F 13/06* | (2006.01) |

(Continued)

(52) U.S. Cl.
CPC .............. *E04C 5/07* (2013.01); *B29C 70/688* (2013.01); *B29C 70/88* (2013.01); *C08J 7/04* (2013.01);
(Continued)

(58) Field of Classification Search
CPC ...... B29C 70/688; B29C 70/88; E04F 13/068; E04C 5/07
See application file for complete search history.

(56) References Cited

U.S. PATENT DOCUMENTS

| | | | |
|---|---|---|---|
| 3,515,623 A | 6/1970 | Bates | |
| 6,263,629 B1 * | 7/2001 | Brown, Jr. | .............. E04C 2/044 442/179 |

FOREIGN PATENT DOCUMENTS

| | | |
|---|---|---|
| DE | 3621235 A1 | 1/1988 |
| DE | 3430614 C2 | 6/1991 |

(Continued)

OTHER PUBLICATIONS

European Search Report dated Feb. 13, 2017, in corresponding European Patent Application No. 16197615.4 (5 pages).

(Continued)

*Primary Examiner* — Babajide A Demuren
(74) *Attorney, Agent, or Firm* — Fitch, Even, Tabin & Flannery LLP (57) ABSTRACT

A reinforcing mesh element for embedding in a cement matrix of a building structure, preferably in a corner region or in a curved region. The reinforcing mesh element has a grid-shaped arrangement of fiber bundles that are embedded in a plastic matrix. The reinforcing mesh element has at least one rigid zone and at least one flexible zone. In the at least one flexible zone the plastic matrix consists of an elastomer plastic. The plastic matrix comprises in the at least one rigid zone a thermoset plastic. The flexible or rigid form of the reinforcing mesh element is thus obtained, due to the set-up of the plastic matrix. Additional stiffening bodies or stiffening elements that are connected with the grid-shaped arrangement can be omitted. The reinforcing mesh element (Continued)

can be adapted to the respective situation and simplifies handling when manufacturing a building structure.

13 Claims, 5 Drawing Sheets

(51) Int. Cl.
    *B29K 9/06*     (2006.01)
    *B29K 23/00*     (2006.01)
    *B29K 707/04*     (2006.01)
    *B29K 709/08*     (2006.01)

(52) U.S. Cl.
    CPC ........ *E04F 13/068* (2013.01); *B29K 2009/06* (2013.01); *B29K 2011/00* (2013.01); *B29K 2023/16* (2013.01); *B29K 2677/10* (2013.01); *B29K 2707/04* (2013.01); *B29K 2709/08* (2013.01); *B29K 2995/0046* (2013.01); *B29K 2995/0082* (2013.01)

(56) References Cited

FOREIGN PATENT DOCUMENTS

| | | | | |
|---|---|---|---|---|
| DE | 4123055 A1 | * | 1/1993 | ........... D03D 13/004 |
| DE | 29923709 | * | 5/2001 | |
| DE | 102020103451 A1 | * | 8/2021 | |
| EP | 634537 A2 | * | 1/1995 | ............. B29C 70/08 |
| EP | 1094171 A2 | | 4/2001 | |
| EP | 1281822 A1 | | 2/2003 | |
| EP | 1514978 A2 | | 3/2005 | |
| WO | 97/19226 A1 | | 5/1997 | |
| WO | WO-9719226 A1 | * | 5/1997 | ........... B29B 15/125 |

OTHER PUBLICATIONS

International Search Report and Written Opinion dated Jan. 2, 2018, in corresponding International Patent Application No. PCT/EP2017/078359 (10 pages).

* cited by examiner

REINFORCING MESH ELEMENT, STRUCTURE HAVING SUCH A REINFORCING MESH ELEMENT AND METHOD FOR PRODUCING A REINFORCING MESH ELEMENT

CROSS REFERENCE TO RELATED APPLICATIONS

This patent application is the national phase of PCT/EP2017/078359, filed Nov. 6, 2017, which claims the benefit of European Patent Application No. EP16197615.4, filed Nov. 7, 2016.

TECHNICAL FIELD

The invention refers to a reinforcing mesh element for a building structure that is configured to be embedded into a cement matrix or concrete matrix of a building structure, as well as a method for producing such a reinforcing mesh element. The invention also refers to a building structure that contains at least one reinforcing mesh element.

BACKGROUND

Reinforced building structures and respective reinforcing mesh elements are known. Reinforcements can be formed by textile elements or steel elements.

DE 3 430 614 C2 describes a so-called plaster angle. Such plaster angles also comprise mesh-shaped sections and have remarkably smaller mesh sizes compared with reinforcing meshes for building structures that shall improve the tensile strength for improving the carrying capacity. Plaster angles serve to form the corner region of a ground for a visible plaster layer, in order to improve the applying of the visible plaster layer and its adhesion. In the known plaster angle a glass fiber textile strip is present that comprises a corner strutting with an additional strutting element. A similar plaster angle is also known from EP 1 514 978 A2 as well as DE 3 621 235 A1.

EP 1 281 822 A1 describes a profile strip from extruded plastic with a net-like textile mesh strip attached thereto for forming an angled profile.

Different to such plaster angles that are applied as intermediate layer between the building structure and a plaster layer, the present invention is directed to the improvement of a reinforcing mesh element that is configured for embedding in a cement matrix of a building structure and shall increase its tensile strength or bending resistance in a corner region and/or a curved region. The reinforcing mesh element shall particularly allow an improved handling during manufacturing of a building structure.

SUMMARY

This object is solved by a reinforcing mesh element, a building structure, as well as a method having the features described herein.

A reinforcing mesh element according to the invention is configured to be embedded into a cement matrix or concrete matrix of a building structure. The building structure can be pre-manufactured in a plant, e.g. a pre-manufactured concrete part, that is supplied to the construction site for building a building or the building structure can be manufactured at the site using the reinforcing mesh element. As cement matrix site concrete, sprayed concrete or mortar can be used.

The reinforcing mesh element has a mesh-shaped arrangement of fiber bundles that are embedded into a plastic matrix. For this purpose the fiber bundle can be, e.g. immersed with a plastic that is subsequently hardened. The fiber bundle of the mesh-shaped arrangement forms at least two groups. One group of fiber bundles extends in a first direction and another group of fiber bundles extends in a second direction. The two directions can be oblique or rectangular oriented with regard to each other, such that the two groups form cross locations between the single fiber bundles. Each fiber bundle is substantially stretched. Preferably the groups of fiber bundles form a laid fabric. This means an arrangement, in which one group of fiber bundles is led onto one side of an adjacent group of fiber bundles and can be connected at the crossing locations by means of connection means, like threads or the like. The fiber bundles of one group are only arranged on one side of the adjacent group and do not change sides, as it would be the case in a woven fabric. By means of the laid fabric stretching of the fiber bundles in their respective extension direction is improved and the corrugations are reduced.

The fiber bundles of a common group extend preferably parallel to each other respectively.

The grid-shaped arrangement has meshes that are formed by plastic immersed fiber bundles. For example, the meshes can substantially have a square or rectangular form. Thereby the mesh size amounts preferably at least 10 mm ×at least 10 mm and e.g. at least 20 mm ×at least 20 mm up to at most 30 mm ×at most 30 mm. Different from the rectangular mesh shape, other arbitrary mesh shapes can be formed. This depends on how many groups of fiber bundles are used for forming the grid-shaped arrangement.

The reinforcing mesh element has at least one rigid zone and one flexible zone. The whole reinforcing mesh element can be divided into the at least one rigid and the at least one flexible zone, such that further areas or zones are not present. All of the present rigid zones preferably have the same constructive build-up. All of the present flexible zones preferably have the same constructive build-up.

In the at least one flexible zone the fiber bundles are embedded into a plastic matrix of elastomer plastic. The elastomer plastic can contain rubber or can be formed by rubber. The rubber can consist, e.g. of styrene-butadiene rubber (SBR) and/or chloroprene rubber (CR) and/or ethylene-propylene-dien rubber (EPDM). In the flexible zone the reinforcing mesh element is thus bendable about at least one bending edge or at least one bending area. For example, the reinforcing mesh element can be brought into the form of an angle or adapted to a curvature or radius of the building structure by means of such a flexible zone.

In the rigid zone the plastic matrix contains a thermoset plastic material. This can contain synthetic resin or can be formed by synthetic resin. The synthetic resin can be an epoxide resin and/or a polyurethane resin.

Each fiber bundle contains a plurality of fibers and/or filaments. These can consist of aramid and/or glass and/or carbon. In a preferred embodiment with which particularly high fracture stresses can be reached, the fiber bundles are formed by carbon filaments and in the rigid zone coated with epoxide resin. In doing so, the plastic in the flexible zone is preferably formed by styrene-butadiene rubber.

The reinforcing mesh element is thus formed by an arrangement and preferably a laid fabric from fiber bundles that are immersed and/or coated with different plastic materials in the different zones. Thus, a uniform reinforcing mesh element can be obtained that is free from additional stiffening parts. Particularly, the mesh structure or the mesh size respectively of the reinforcing mesh element in the at least one flexible zone and in the at least one rigid zone can substantially have the same size. The area that is bordered by a mesh of the mesh-shaped arrangement in the rigid zone differs particularly about 5-10% at most from the area that is bordered by the meshes of the mesh-shaped arrangement in the at least one flexible zone, if the distance of the crossing locations of the mesh-shaped arrangement or the distance of the fiber bundles of one group in the flexible and in the rigid zone is equal. The reinforcing mesh element has a substantially constant thickness due to the inventive build-up.

The reinforcing mesh element can have at least one and preferably one flexible zone that extends in one direction, e.g. in the first direction or in the second direction, completely over the reinforcing mesh element, for example. This flexible zone can be bordered at opposite sides by one rigid zone respectively, wherein the two rigid zones are completely separated from each other and are not linked with each other due to the flexible zone arranged in between. In doing so, the width of the flexible zone corresponds to the distance between the two rigid zones. This width of the flexible zone can substantially correspond to the mesh size of the mesh-shaped arrangement and can be thus quite small. In doing so, a small radius is formed in the flexible zone during bending, such that the reinforcing mesh element can form a reinforcing angle for rectangular corners. If the width of the flexible zone and thus the distance between the rigid zones is selected to be larger, the reinforcing mesh element can be adapted to a larger radius or a curvature of the building structure respectively.

In a further embodiment the reinforcing mesh element contains a rigid zone and preferably exactly one rigid zone that extends in one direction, e.g. in the first direction or the second direction, completely over the reinforcing mesh element. The reinforcing mesh element can have two flexible zones that are separated completely from each other and are thus not linked with each other due to the rigid zone that is arranged in between. Such a reinforcing mesh element has a predefined, e.g. angle form, in the rigid zone. Adjacent to this rigid area with a defined form it contains a respective flexible zone. This flexible zone can be adapted to different forms and shapes of the building structure, e.g. adjacent to a corner of the building structure.

It is advantageous, if the at least one flexible zone and the at least one adjacent rigid zone comprise an overlapping area. Particularly each transition between a flexible zone to an adjacent rigid zone comprises one overlapping area, in which elastomer plastic material as well as thermoset plastic material is present. In doing so, it can be advantageous if the elastomer plastic material is, at its outer surface or skin surface, at least partially covered or coated by the thermoset plastic material. This can be achieved, e.g. in that the elastomer plastic material is first applied in the at least one flexible zone and subsequently the thermoset plastic material is applied in the at least one rigid zone.

In one embodiment the plastic matrix in the rigid zone can be formed by a thermoset plastic material. In doing so, the rigid zone is free from the elastomer plastic material of an adjacent flexible zone—apart from the overlapping area. This can be achieved, for example, in that the elastomer plastic material is only applied in the at least one flexible zone and the thermoset plastic material is only applied in the at least one rigid zone. This can be executed in an arbitrary sequence.

In one embodiment the plastic matrix in the rigid zone can comprise an elastomer plastic material saturating the fiber bundles that is at least partly coated with a thermoset plastic material at its outer surface. This set-up can be achieved in that all of the fiber bundles of the mesh-shaped arrangement are immersed with an elastomer plastic material in all of the zones and subsequently only the at least one rigid zone is coated with a thermoset plastic material. This has the advantage that masking of the fiber bundles during immersing with the elastomer plastic material is not necessary. The fiber bundles are completely protected by the elastomer plastic material, e.g. also from chemical reactions with the cement matrix of the building structure. In doing so, the thermoset plastic material may serve to define the form in the at least one rigid zone and can particularly be selected with regard to this characteristic.

For manufacturing a reinforcing mesh element the following steps are taken:

First, a grid-shaped arrangement of fiber bundles is provided. The fiber bundles are immersed with the elastomer plastic material at least in the area that forms the at least one flexible zone afterwards. In doing so, it is possible to immerse the whole grid-shaped arrangement with the elastomer plastic material, that is also the area that forms the at least one rigid zone afterwards. Subsequently, the elastomer plastic material is preferably hardened. Subsequently, the fiber bundles are immersed with the thermoset plastic material or if they have been already immersed with the elastomer plastic material, are coated with the thermoset plastic material in the area that forms the at least one rigid zone afterwards. Subsequently, the thermoset plastic material is hardened to form the rigid zone.

Alternatively, in a different embodiment of the method the fiber bundles can be immersed in the area first that forms the at least one rigid zone afterwards. Subsequently, the zone that subsequently forms the at least one flexible zone, can be immersed with the elastomer plastic material. Further it is also possible to immerse or coat the complete rigid arrangement with the elastomer plastic material after immersing of the area with the thermoset plastic material that forms the rigid zone afterwards. Also in this procedure the thermoset plastic material can be hardened before applying the elastomer plastic material.

A building structure can comprise at least one of such a reinforcing mesh element, as described above. The at least one reinforcing mesh element is placed in the still not hardened cement matrix and the cement matrix is hardened subsequently. This can happen distant from the construction site of a building and the building structure can be supplied as a pre-manufactured part. It is also possible to manufacture the building structure in place at the construction site.

The building structure can be a load-carrying building structure.

The building structure can be realized as concrete body. The concrete body has a concrete matrix of cement and stone grains and can contain concrete additives.

BRIEF DESCRIPTION OF THE DRAWINGS

Additional advantageous embodiments of the invention are obvious from the dependent claims, the description and the drawings. Subsequently preferred embodiments are discussed in detail with reference to the attached drawings. It shows:

DETAILED DESCRIPTION

Figure 12:
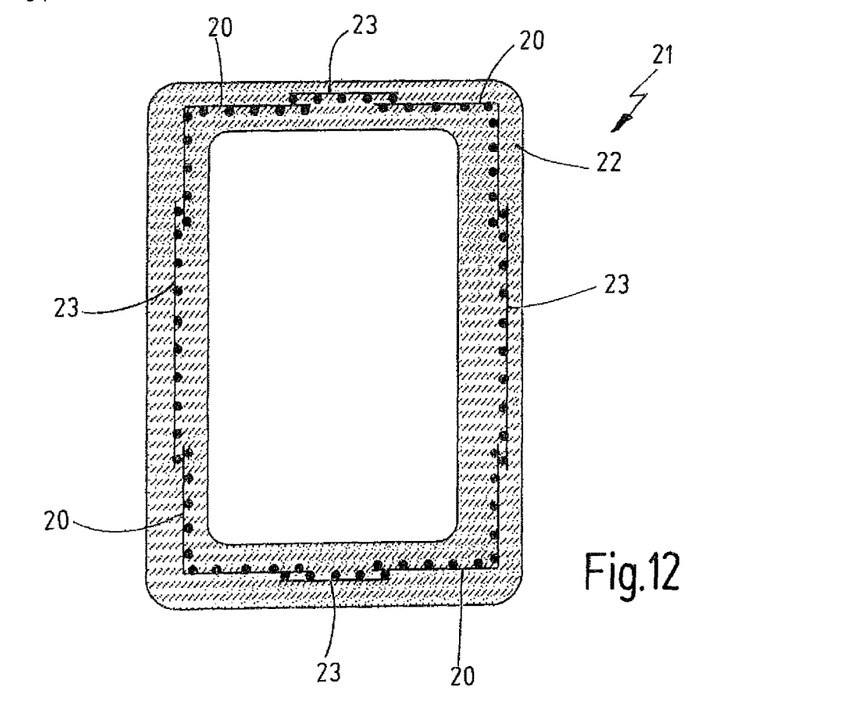

FIGS. 1 to 4 highly schematically illustrate different embodiments of a reinforcing mesh element 20 that is configured for manufacturing of a building structure 21. An exemplary building structure 21 is shown in FIG. 12. There four reinforcing mesh elements 20, according to an inventive embodiment, are embedded in a cement matrix 22. The inventive reinforcing mesh elements 20 serve to improve the tensile strength or bending strength of the building structure in corner regions or curved regions. The reinforcing mesh elements 20 can be integrated with additional usual reinforcements 23 in the cement matrix 22, as schematically shown in FIG. 12. In FIG. 12 the building structure 21 is formed by a ring-shaped closed body, e.g. by a concrete ring, as it is used for build-up of a chute, only as an example. Basically the building structure 21 can have any arbitrary form with corners and/or curvatures.

Figure 6:
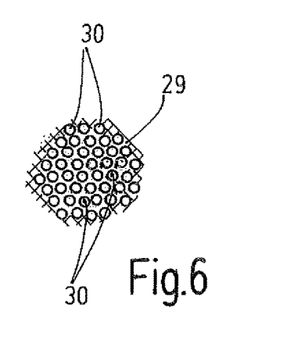
Figure 7:
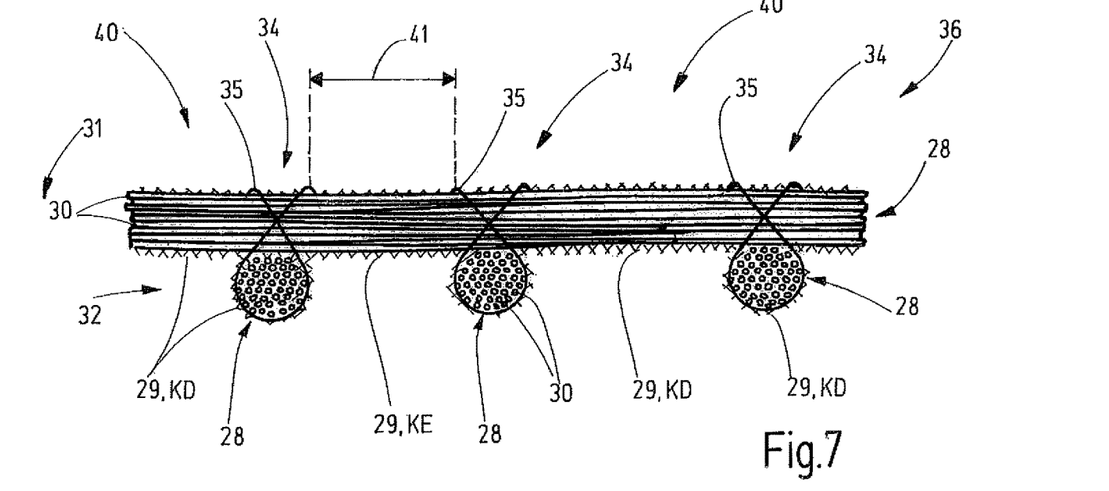

For forming the grid-formed structure reinforcing mesh element 20 comprises a grid-shaped arrangement 27 of fiber bundles 28 that are embedded in a plastic matrix 29. The plastic matrix 29 is schematically illustrated in FIGS. 6 and 7 by means of a crosshatch. The plastic matrix 29 encloses the fibers and/or filaments 30 of the respective fiber bundles 28 and establishes also a connection between the single fibers and/or filaments 30. In the embodiment filaments 30 are used for the plastic fiber bundles 28 that consist, for example, of aramid and/or carbon and/or glass. For the plastic matrix 29 different plastic materials are used that is subsequently further explained in detail.

The fiber bundles 28 form at least one first group 31 and one second group 32. The fiber bundles 28 of a common group 31 or 32 respectively extend substantially parallel to each other in the same direction. For example, the fiber bundles 28 of the first group 31 extend in a length direction L and the fiber bundles 28 of the second group 32 in a transverse direction Q. The length direction L and the transverse direction Q are orientated rectangular to each other in the embodiment. The distance between directly adjacent fiber bundles 28 within one group 31 or 32 respectively is equal in the embodiment. In doing so, a grid-shaped arrangement 27 with square or rectangular meshes 33 is obtained. The meshes 33 have the same size in the herein described embodiments. It would also be possible to vary the meshes 33 in different areas by a respective variation of the distance of adjacent fiber bundles 28. In the embodiment each mesh has a length x in the length direction L and a width y in the transverse direction Q. The length x and the width y are preferably larger than 10 mm and more preferably larger than 20 mm. In one embodiment the length x and the width y can be 21 mm. The length x and the width y are preferably 30 mm at most.

Figure 5:
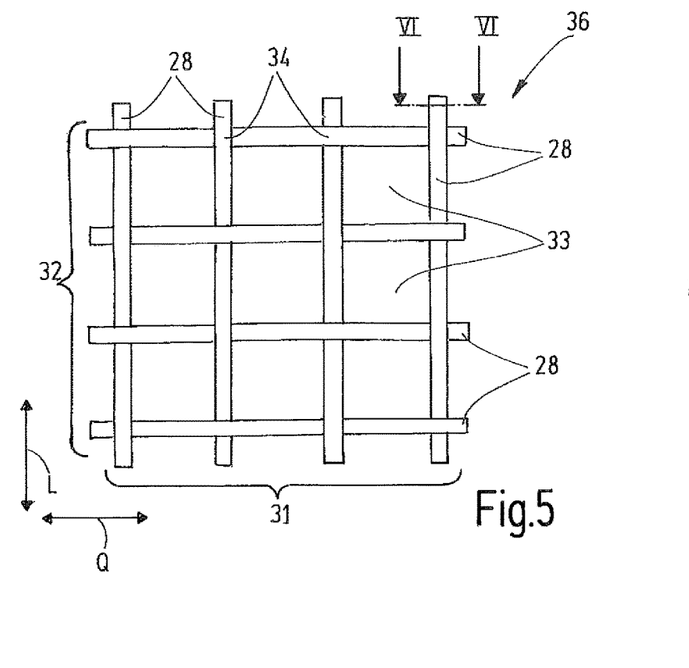

The fiber bundles 28 can be connected with each other at the crossing locations 34 at which the fiber bundles 28 of the two groups 31 and 32 cross each other. As connection means a connection thread 35 can be used (FIGS. 5 and 7). The connection means or the connection thread 35 respectively serves to fix the fiber bundles 28 in their relative orientation before immersion with the plastic material. At the crossing locations 34 the crossing fiber bundles 28 can also be connected by material bond after immersion and hardening of the plastic matrix 29.

The meshes 33 form through holes of the reinforcing mesh element 20, such that the not yet hardened cement of the cement matrix 22 flows through the meshes 33 and the reinforcing mesh element 20 is fixedly embedded in the building structure 21 after hardening.

As illustrated in FIGS. 5 and 7, the fiber bundles 28 or the two groups 31 and 32 respectively form a laid fabric 36. The first group 31 of the fiber bundles 28 is arranged in a first layer and the second group 32 of the fiber bundles 28 is arranged in an adjacent second layer. The fiber bundles 28 remain in their respective layer and do not change sides with reference to the respective adjacent layer. In other words, the one first group 31 of fiber bundles 28 is laid from one side to the other second group 32 of fiber bundles 28 and connected at the crossing locations 34. Thus, the fiber bundles 28 form the laid fabric 36.

The reinforcing mesh element 20 is divided into at least one rigid zone 40 and at least one flexible zone 41. The plastic matrix 29 in a flexible zone 41 is different from the plastic matrix 29 in a rigid zone 40. The plastic matrix 29 is formed by an elastomer plastic KE in the flexible zone 41. In the at least one rigid zone 40 the plastic matrix 29 is formed by a thermoset plastic KD or comprises a thermoset plastic KD (FIGS. 7, 12 and 13). Due to the different plastic materials, the reinforcing mesh element obtains in the at least one flexible zone 41 an elastic bendable form, whereas it is rigid in the at least one rigid zone 40. For stiffening no additional stiffening bodies or separate parts are necessary. Rather the immersion of the plastic fiber bundles 28 or their coating with a plastic KE or KD respectively is used to obtain the desired characteristic in the respective zone 40 or 41.

Figure 9:
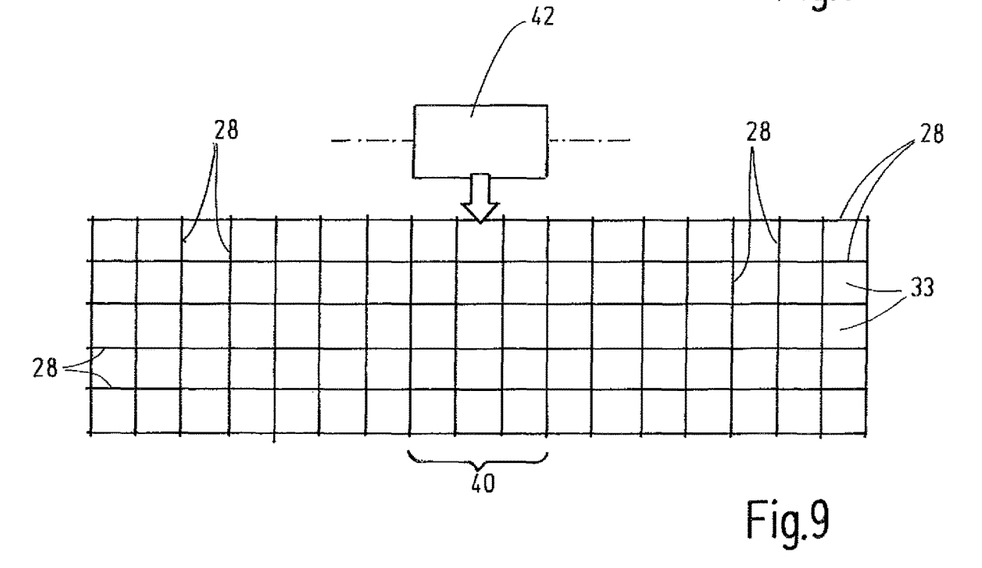
Figure 10:
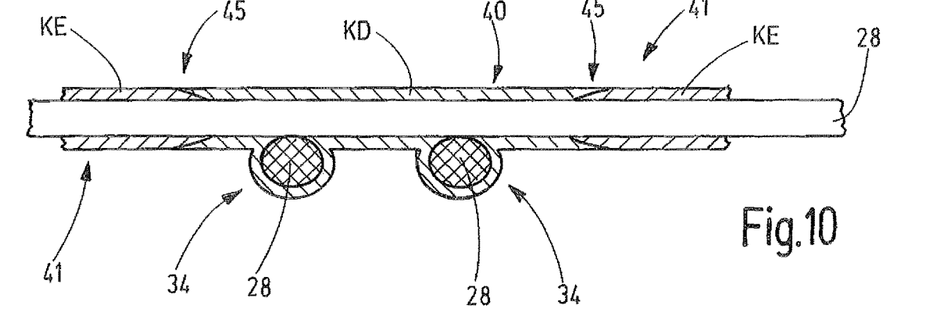

For manufacturing the reinforcing mesh element 20 the whole laid fabric 36 can be immersed with an elastomer plastic KE in a bath. Subsequently, the elastomer plastic KE can be hardened. In a subsequent step the elastomer plastic KE present in the at least one rigid zone 40 can be selectively coated with the thermoset plastic KD, e.g. by application with one or more rollers 42 as schematically shown in FIG. 9. Also spraying or other application limited to the rigid zone 40 is possible.

Figure 11:
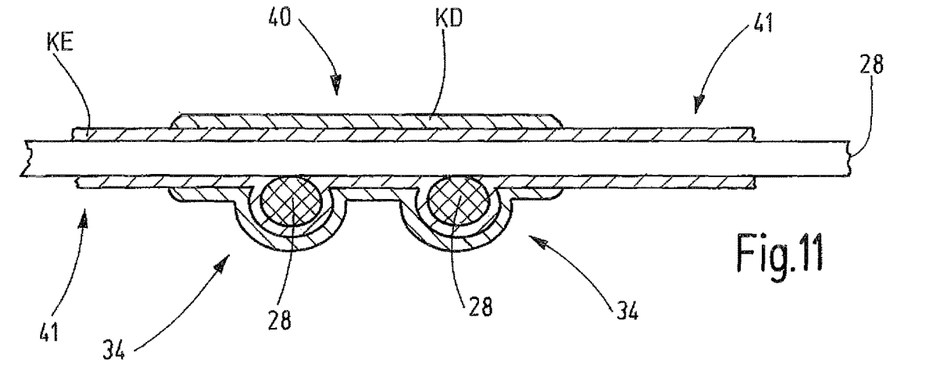

In doing so, in the at least one rigid zone 40 the thermoset plastic KD is arranged as coating around the fiber bundles 28 immersed with the elastomer plastic KE, which is highly schematically illustrated in FIG. 11.

Figure 8:
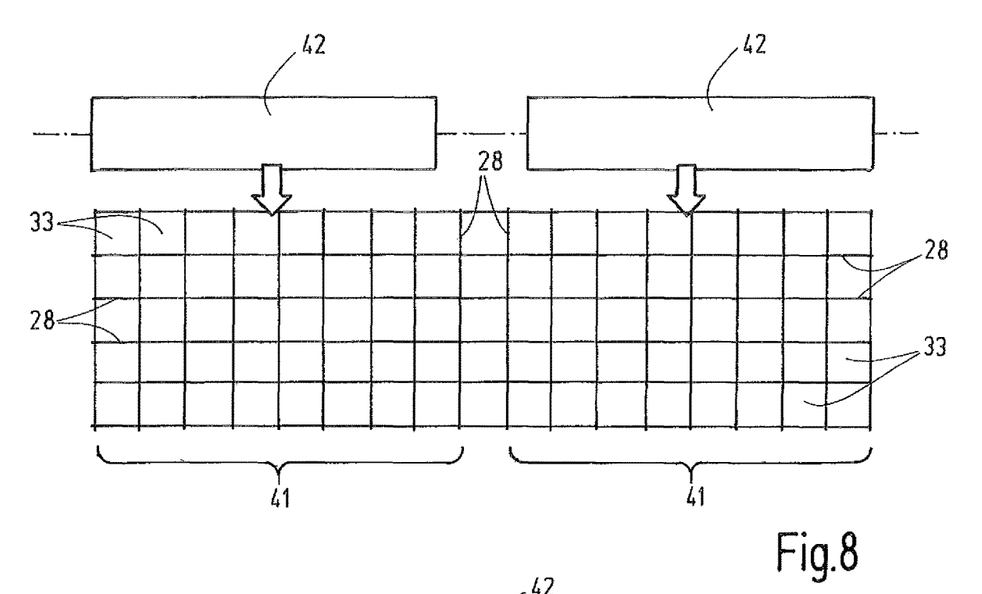

It is also possible to apply the plastic materials substantially limited onto the respective zones 40 or 41, e.g. with one or more rollers 42, as schematically illustrated in FIGS. 8 and 9. The sequence is arbitrarily selectable. Either the elastomer plastic KE can be applied in the at least one flexible zone 41 or the thermoset plastic KD can be applied in the at least one rigid zone 40 first. Instead of the rollers 42 used in FIGS. 8 and 9, other means can be used for application.

In doing so, it is preferred that the plastic material of directly adjacent zones overlap in an overlapping area 45. In doing so, it is ensured that the fiber bundles 28 are completely bound in a plastic matrix 29 and no gap or intermediate space remains between the plastics KE, KD in the border region between a rigid zone 40 and a flexible zone 41. In the overlapping area 45 the thermoset plastic KD is applied as outer coating onto the elastomer plastic KE for example. This is achieved in that the elastomer plastic KE is applied first and the thermoset plastic KD is applied subsequently. Also a reversed sequence is possible. Then the elastomer plastic KE covers the thermoset plastic KD in the overlapping area 45.

The laid fabric 36 immersed with plastic KE or KD respectively is hardened for forming the reinforcing mesh element 20. The hardening can be executed either in one common step, if the plastic materials KE and KD are applied in both zones 40, 41 or alternatively in the first step after application of one plastic material KE or KD and subsequently in a second step again after application of the respective other plastic material KD or KE.

The hardening can be done by supplying of electromagnetic radiation and/or thermal radiation and/or contact thermal conduction. Preferably at least the hardening of the thermoset plastic KD is done in a die, that is for example heatable, for definition of the shape of the at least one rigid zone 41.

The reinforcing mesh element 20 can be manufactured and used in different variations. In the embodiment shown in FIGS. 1 and 2 the reinforcing mesh element 20 comprises one and e.g. exactly one elastic zone 41 that is arranged between two rigid zones 40 and separates the rigid zones 40 completely from each other. The elastic zone 41 extends completely along the total length of the reinforcing mesh element 20 in length direction L. In transverse direction Q the elastic zone 41 has a width b. In the illustrated embodiment the width b of the elastic zone 41 corresponds substantially to the width y of a mesh 33. The elastic zone 41 is thus quite small in transverse direction Q. If the two rigid zones 40 are moved toward each other out of the common plane around a bending axis A, that extends parallel to the length direction L, a curvature is created in the flexible zone 41 in the region of the bend axis A with quite a small radius. Thus, the reinforcing mesh element 20 can be used for reinforcing of corner regions of the building structure 21.

Figure 1:
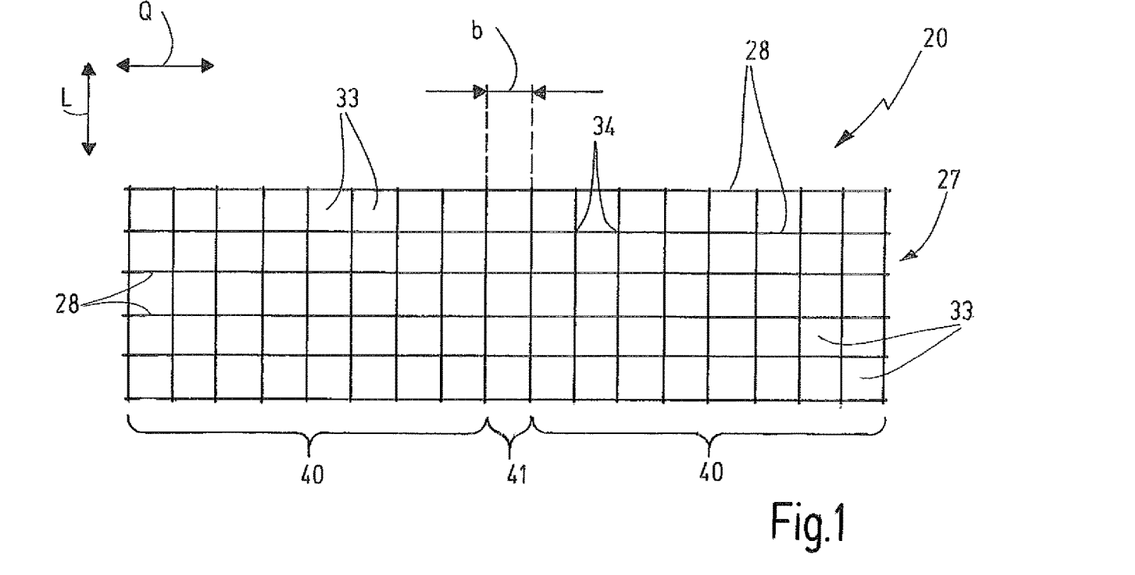
FIG. 1 a highly schematic illustration of an embodiment of a reinforcing mesh element with viewing direction transverse to the length direction and transverse to a transverse direction, FIG. 2 a schematic perspective illustration of the reinforcing mesh element of FIG. 1, wherein a flexible zone is bent in the area of a bending edge, FIG. 3 a highly schematic perspective illustration of a further embodiment of a reinforcing mesh element with an angled rigid zone in the area of a bending edge, the rigid zone being joined by a respective flexible zone, FIG. 4 the embodiment of the reinforcing mesh element of FIG. 3 in a schematic top view, FIG. 5 a schematic basic illustration of an embodiment of a laid fabric of two groups of fiber bundles that are embedded in a plastic matrix, FIG. 6 a cross-section through a fiber bundle of FIG. 5 according to cutting line VI-VI, FIG. 7 the laid fabric of FIG. 5 in a highly schematic side view, FIGS. 8 and 9 a schematic basic illustration for immersing or applying a plastic material in defined areas of a laid fabric of fiber bundles respectively, FIGS. 10 and 11 a schematic sectional view in an overlapping area of a reinforcing mesh element, in which a rigid zone and a flexible zone merge into each other respectively and FIG. 12 a simplified schematic illustration of an exemplary embodiment of a building structure with several reinforcing mesh elements in a sectional view.
Figure 2:
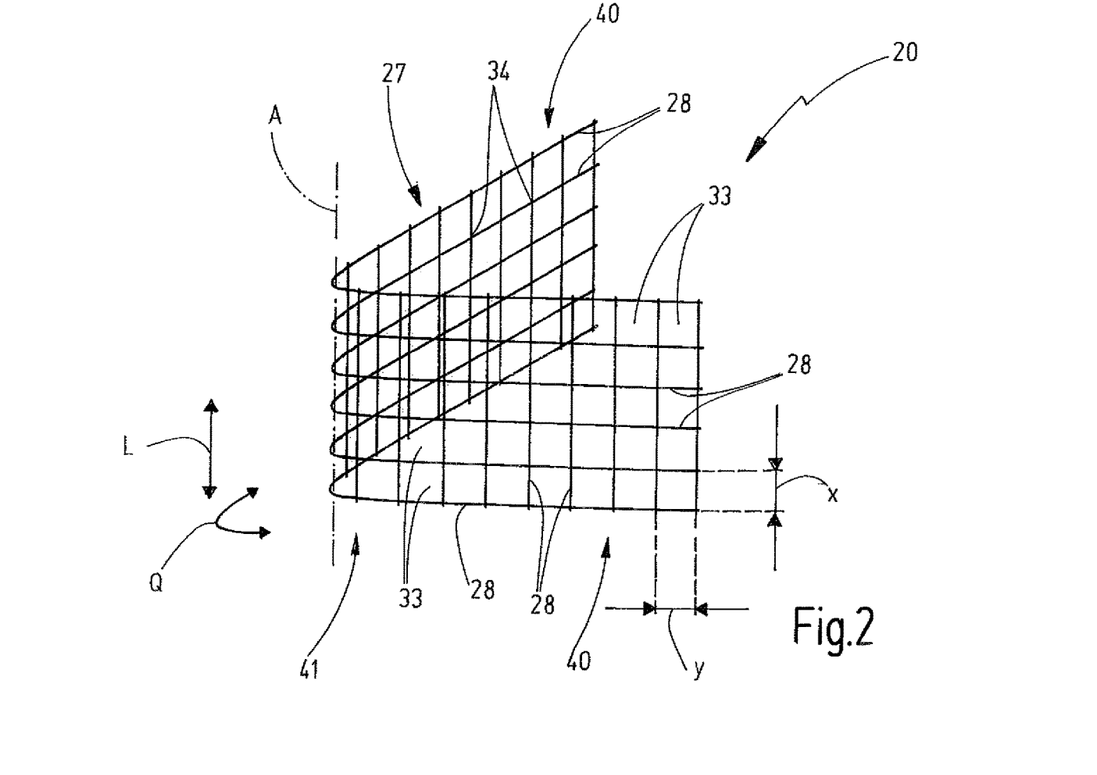

Different to the embodiment according to FIGS. 1 and 2, the width b of the flexible zone 41 can be extended over several meshes, such that a larger radius in the flexible zone 41 is obtained during bending. In doing so, building structures 21 can be reinforced in the region of round sections.

Figure 3:
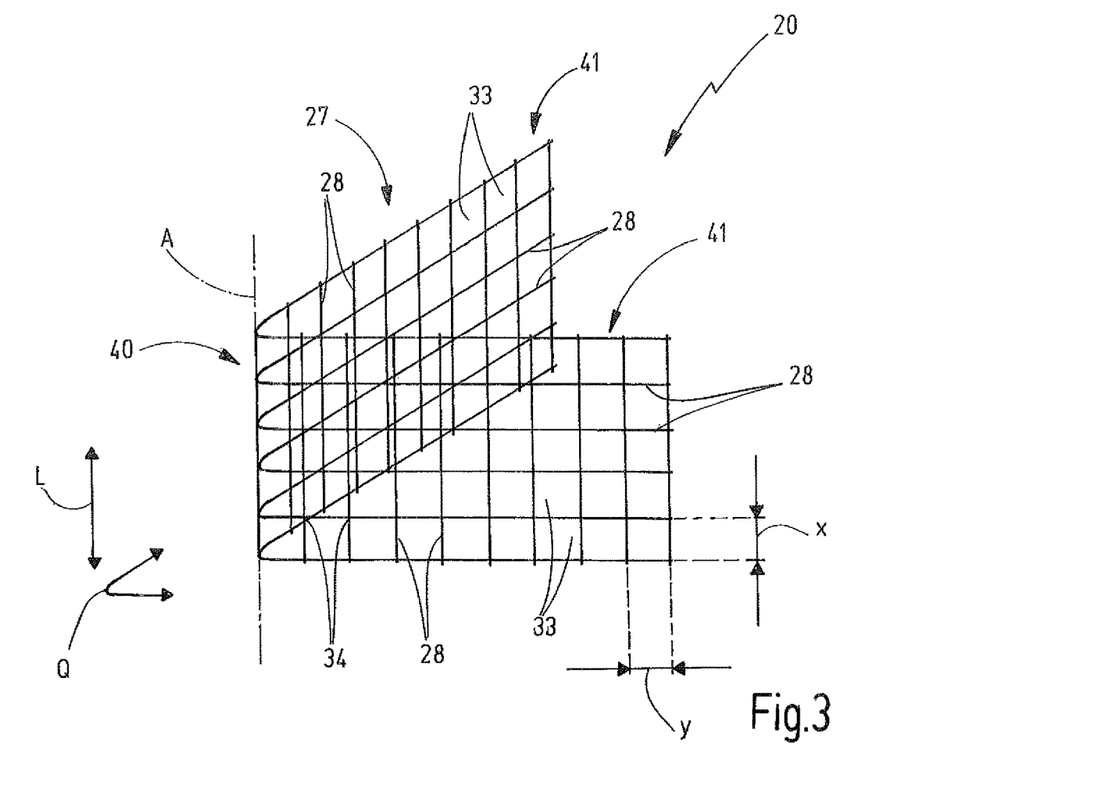
Figure 4:
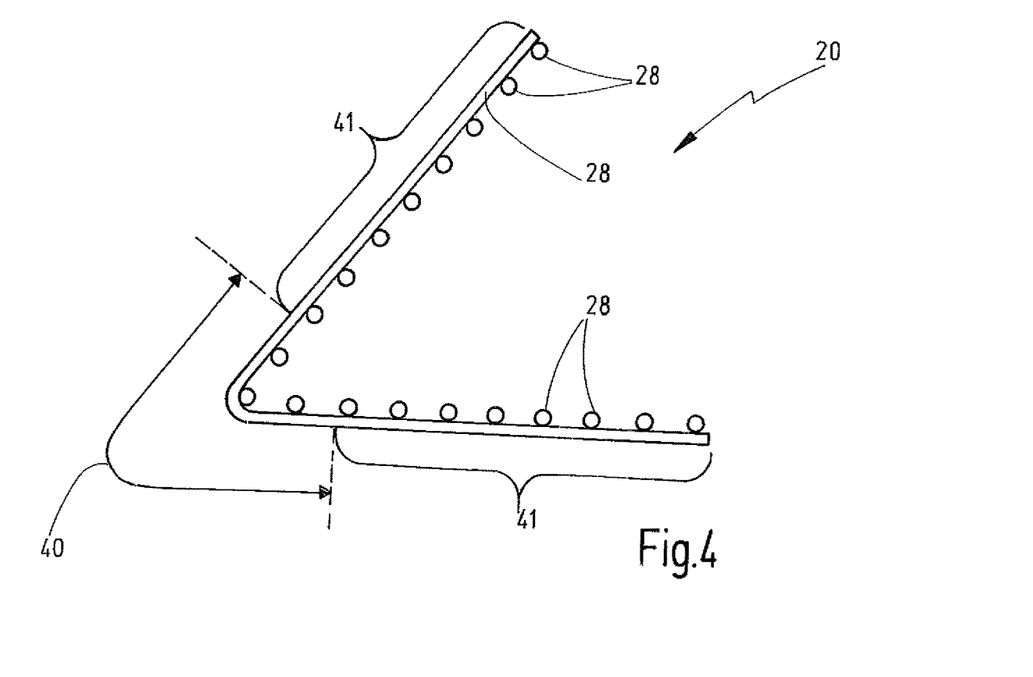

Another embodiment of a reinforcing mesh element is shown in FIGS. 3 and 4. There the reinforcing mesh element 20 comprises one and according to the example exactly one rigid zone 40 that is arranged between two flexible zones 41 and separates the flexible zones 41 completely from each other. The rigid zone 40 extends completely over the total length of the reinforcing mesh element 20 in length direction L. The rigid zone 40 predefines a radius and/or angle at the bending edge A. The respective flexible zone 41 connects thereto. With such a reinforcing mesh element 20 a corner or curved area of a building structure 21 can be reinforced, wherein the reinforcing mesh element 20 variably adapts to different forms or contours of a building structure 21 joining a corner or a curvature.

Different to the illustrated embodiments, reinforcing mesh elements 20 with an arbitrary number of flexible and/or flexible zones 41, 40 can be realized. The dimension of the reinforcing mesh element 20 in length direction L and in transverse direction Q is arbitrary. The exemplary illustration in the figures according to which the dimension in length direction L is smaller than in transverse direction Q is only exemplary.

As elastomer plastic material rubber is used in the embodiment, like styrene-butadiene rubber (SBR) and/or chloroprene rubber (CR) and/or ethylene-propylene-dien rubber (EPDM). As thermoset plastic KD preferably a synthetic resin is used, like epoxide resin and/or a polyurethane resin.

The invention refers to a reinforcing mesh element 20 for embedding in a cement matrix 22 of a building structure 21 preferably in a corner region or in a curved region of a building structure 21. The reinforcing mesh element 20 has a grid-shaped arrangement 27 of fiber bundles 28 that are embedded in a plastic matrix 29. The reinforcing mesh element 20 has at least one rigid zone 40 and at least one flexible zone 41. In the at least one flexible zone 41 the plastic matrix 29 consists of an elastomer plastic KE. In contrast the plastic matrix 29 comprises in the at least one rigid zone 40 a thermoset plastic KD. The flexible or rigid form of the reinforcing mesh element 20 is thus obtained, due to the set-up of the plastic matrix. Additional stiffening bodies or stiffening elements that are connected with the grid-shaped arrangement 27 can be omitted. The reinforcing mesh element 20 can be adapted to the respective situation and simplifies handling when manufacturing a building structure 21.

LIST OF REFERENCE NUMERALS 20 reinforcing mesh element
21 building structure
22 cement matrix
23 additional reinforcement
27 grid-shaped arrangement
28 fiber bundle
29 plastic matrix
30 filament
31 first group
32 second group
33 mesh
34 crossing location
35 connection thread
36 laid fabric
40 rigid zone
41 flexible zone
42 roller
45 overlapping area
b width of the flexible zone
KD thermoset plastic
KE elastomer plastic
L length direction
Q transverse direction
x length of the mesh
y width of the mesh

The invention claimed is:

1. A reinforcing mesh element (20) for being embedded in a cement matrix (22) of a building structure (21), the reinforcing mesh element comprising:
   a grid-shaped arrangement (27) of fiber bundles (28) that are embedded in a plastic matrix (29), wherein one group (31) of the fiber bundles (28) extends in one direction (L) and another group (32) of the fiber bundles (28) extends in another direction (Q),
   wherein the grid-shaped arrangement (27) of fiber bundles 28 has at least one rigid zone (40) and at least one flexible zone (41),
   wherein the plastic matrix (29) in the flexible zone (41) is formed of an elastomer plastic (KE), and the plastic matrix (29) in the rigid zone (40) comprises a thermoset plastic (KD).

2. The reinforcing mesh element (20) according to claim 1, further comprising two rigid zones (40) of the at least one rigid zone (40) that are completely separated from each other by the at least one flexible zone (41).

3. The reinforcing mesh element (20) according to claim 1, further comprising two flexible zones (41) of the at least one flexible zone (41) that are completely separated from each other by the at least one rigid zone (40).

4. The reinforcing mesh element according to claim 1, wherein the at least one flexible zone (41) and the at least one rigid zone (40) adjacent to the at least one flexible zone comprise an overlapping area (45).

5. The reinforcing mesh element according to claim 4, wherein the thermoset plastic (KD) is arranged on an outside of the elastomer plastic (KE) in the overlapping area (45).

6. The reinforcing mesh element according to claim 1, wherein the plastic matrix (29) in the rigid zone (40) is formed of the thermoset plastic (KD).

7. The reinforcing mesh element according to claim 1, wherein the plastic matrix (29) comprises an elastomer plastic (KE) that is coated with a thermoset plastic (KD) in the rigid zone (40).

8. The reinforcing mesh element according to claim 1, wherein the elastomer plastic (KE) comprises rubber.

9. The reinforcing mesh element according to claim 8, wherein the rubber comprises at least one of styrene-butadiene rubber (SBR), chloroprene rubber (CR), and ethylene-propylene-dien rubber (EPDM).

10. The reinforcing mesh element according to claim 1, wherein the thermoset plastic comprises a synthetic resin.

11. The reinforcing mesh element according to claim 10, wherein the synthetic resin comprises at least one of epoxide resin and a polyurethane resin.

12. The reinforcing mesh element according to claim 1, wherein the grid-shaped arrangement (27) of the fiber bundles (28) forms a laid fabric (36).

13. The reinforcing mesh element according to claim 1, wherein the fiber bundles (28) comprise fibers and/or filaments (30) that contain at least one of aramid, glass, and carbon.

* * * * *